United States Patent [19]

Hein

[11] 3,887,618

[45] June 3, 1975

[54] USE OF WEAK BASE RESINS AS CATALYSTS FOR THE METHYLOLATION OF ACRYLAMIDE

[75] Inventor: Delton William Hein, Darien, Conn.

[73] Assignee: American Cyanamid Company, Stamford, Conn.

[22] Filed: Feb. 28, 1974

[21] Appl. No.: 446,980

[52] U.S. Cl. ........................... 260/561 N
[51] Int. Cl. ........................... C07c 103/60
[58] Field of Search .................. 260/561 R, 561 N

[56] References Cited
UNITED STATES PATENTS

| | | | |
|---|---|---|---|
| 2,760,977 | 8/1956 | Feuer et al. | 260/561 N |
| 2,864,861 | 12/1958 | Wohnsiedler et al. | 260/561 N |
| 2,864,862 | 12/1958 | Sutherland et al. | 260/561 N |
| 3,064,050 | 11/1962 | Saunders et al. | 260/561 N |

*Primary Examiner*—Curtis R. Davis
*Attorney, Agent, or Firm*—Harry H. Kline

[57] ABSTRACT

There is provided a continuous process for preparing methylolacrylamides by passing a preheated, solution of acrylamide or methacrylamide dissolved in aqueous formaldehyde at a pH between about 6.5 and about 7.5 through a column packed with a weak-base, ion-exchange resin and then recovering the so-formed methylolacrylamide or methylolmethacrylamide in good yield and purity.

10 Claims, No Drawings

USE OF WEAK BASE RESINS AS CATALYSTS FOR THE METHYLOLATION OF ACRYLAMIDE

The present invention relates to the preparation of methylolacrylamides from unsaturated amide monomers. More particularly, it relates to the preparation of methyl-olacrylamides by passing in a continuous manner, a preheated solution of an acrylamide dissolved in an aqueous formaldehyde source through an ion-exchange column. Still more particularly, the invention is concerned with the preparation of methylolacrylamide by continuously passing through a weak-base, ion-exchange resin a preheated solution of acrylamide or methacrylamide dissolved in aqueous formaldehyde at a pH of about 6.5 to about 7.5, and thereafter recovering in good yield a methylolacrylamide or methylolmethacrylamide free from acetone insolubles or other impurities.

It is known that the art is replete with processes for the preparation of a methylolacrylamide utilizing a wide variety of procedures. Unfortunately, each involves lengthy, batch reactions and recovery times to obtain the desired methylolacrylamide which generally is of relatively poor quality, since it contains impurities, such as acetone insolubles, which are removed only after repeated, costly crystallizations. One such method is disclosed in the patent to Saunders et al, U.S. Pat. No. 3,064,050, issued on Nov. 13, 1962. It will be noted that, although high yields of methylolacrylamide are obtained by the batchwise reaction of acrylamide and formaldehyde in an aqueous menstruum having a pH of from about 8 to 11, the process as defined is a timeconsuming batch process which requires repeated recrystallizations. If a speedy, continuous process which does not require repeated recrystallization can be devised, such a procedure would fulfil a long felt need in the art.

It is, therefore, a principal object of the invention to provide an improved process for the preparation of methylolacrylamide in a continuous, economical manner. It is a further object of the invention to procide a speedy synthesis for the preparation of methylolacrylamides substantially free from impurities. Other objects and advantages will be ascertained from a reading of the ensuing description.

To these ends, it has been found that methylolacrylamides can be obtained speedily and economically by directly contacting an acrylamide monomer dissolved in a formaldehyde mixture in the presence of a week-base ion-exchange resin. The resultant solution which flows therethrough is next cooled to precipitate out desired, substantially pure methylolacrylamide which is then obtained in almost quantitative yields by either filtration or centrifuging techniques.

According to the process of the invention, there is initially utilized an aqueous solution of either acrylamide or methacrylamide, preferably at a pH of 6.5 –7.5. A neutralized solution is preferred because it is found that the life of the ion-exchange resin is extended. The neutralization is achieved by introducing a suitable base such as sodium hydroxide, potassium hydroxide, sodium bicarbonate, sodium carbonate, triethylamine and equivalents thereof into aqueous acrylamide or methacrylamide wherein the amount of the latter reactant is at least 50 percent but not more than 80 percent by weight of the amount of the amide and water present in the mixture, and, preferably, from about 60% to about 68 by weight.

As mentioned hereinabove, formaldehyde itself is employed. In general, equimolar amounts of the reactants are employed. It has been found, however, that a slight excess of the aldehyde reactant can be used without affecting the overall reaction. The reactants are premixed and heated to a temperature ranging from about 40°C. to 75°C. at which temperature the resultant mixture is passed through an ionexchange resin column maintained at temperatures within the aforementioned temperature ranges. The residence time within the column is held for not more than five minutes, usually one to two minutes being sufficient to complete the reaction.

Exemplary of the weak-base, ion-exchange resin are Rohm and Haas' Amberlite IRA-68 and Amberlite XE-275 which are gel-like and macroreticular, respectively. Each, however, is a weakly basic anion-exchange resin possessing tertiary amine functionality in a cross-linked acrylic matrix.

Advantageously, the presence of a polymerization inhibitor is not required or desirable during reaction. This is because the reaction is rapid and, therefore, polymerization does not occur.

In order to facilitate a further understanding of the invention, the following examples are presented primarily for the purpose of illustrating certain more specific details thereof. The invention is not to be deemed limited thereof except as defined in the claims. Unless otherwise noted, all parts are by weight.

EXAMPLE 1

An aqueous solution of 1795 parts (25.0 moles) of acrylamide and 1705 parts (25.25 moles) of 44 percent formalin in 545 parts of water neutralized to pH of 7.2 by means of sodium hydroxide is passed through a preheater consisting of a spiral condenser heated to 66°C. to raise the temperature of the mixture to about 60°C. The mixture is next passed into a 4.5 cm. diameter by 20 cms. high column of Amberlite XE-275 at a rate whereby the residence time of aqueous neutralized solution consisting of acrylamide and formalin within the column is one and one-half (1 ½) minutes.

Quantitative yields of excellent quality 60% aqueous N-methylolacrylamide solution which is clear and colorless is obtained free from acetone-insolubles. The column is employed continuously for some 6 hours without observing any fouling of the resin within the column.

The aqueous solution is next cooled to a temperature of about 10°C. whereby the methylolacrylamide crystalizes out of solution and is separated by filtration which is finally air-dried.

Similar results are obtained when methacrylamide is employed to replace acrylamide to yield N-methylolmethacrylamide.

EXAMPLE 2

Repeating Example 1 in every detail except that the initial pH of the reactant mixture is raised to 7.4 and the resin is Amberlite IRA-68. The residence time is increased to three minutes and similar results as in Example 1 are attained.

EXAMPLE 3

The procedure of Example 1 is repeated in every detail except that 1490 g. (25 moles) of 56 percent formalin are used in lieu of the 44 percent formalin employed therein. Similar yields of product with attendant good purity are obtained as in the above Example 1.

As employed hereinabove, the terms "methylolacrylamide" and "methylolmethacrylamide" are intended to be defined as N-methylolacrylamide and N-methylolmethacrylamide, respectively.

I claim:

1. A continuous process for preparing a methylolacrylamide which comprises: admixing a solution of an acrylamide dissolved in an aqueous formaldehyde menstruum at a pH ranging from 6.5 – 7.5, preheating said solution at a temperatute ranging from 40°C. to 75°C., passing said preheated solution through a column packed with a weakly basic, ion-exchange resin maintained at a temperature between 40°C. and 75°C., said solution being passed through at a residence time of from one to five minutes, and recovering a N-methlolacrylamide in good yield and purity.

2. The process according to claim 1 wherein the preheating temperature is maintained at 60°C.

3. The process according to claim 1 wherein the acrylamide reacted is acrylamide.

4. The process according to claim 1 wherein the acrylamide reacted is methacrylamide.

5. The process according to claim 1 wherein the basic ion-exchange resin possesses tertiary amine functionality in a cross-linked acrylic matrix.

6. The process according to claim 1 wherein the residence time of the reaction solution in the ion-exchange column is 1.5 minutes.

7. The process according to claim 1 wherein the N-methylolacrylamide is recovered from solution by cooling the same to 10°C. to precipitate said methylolacrylamide.

8. The process according to claim 7 wherein the precipitate obtained from cooled solution is separated therefrom by filtration.

9. The process according to claim 1 wherein the solution is preparard initially at a pH=7.2.

10. The process according to claim 1 wherein the solution is prepared initially at a pH=7.4.

* * * * *